Jan. 4, 1955     C. E. HEDEEN     2,698,728
SUNSHADE SUPPORT
Filed Nov. 21, 1951
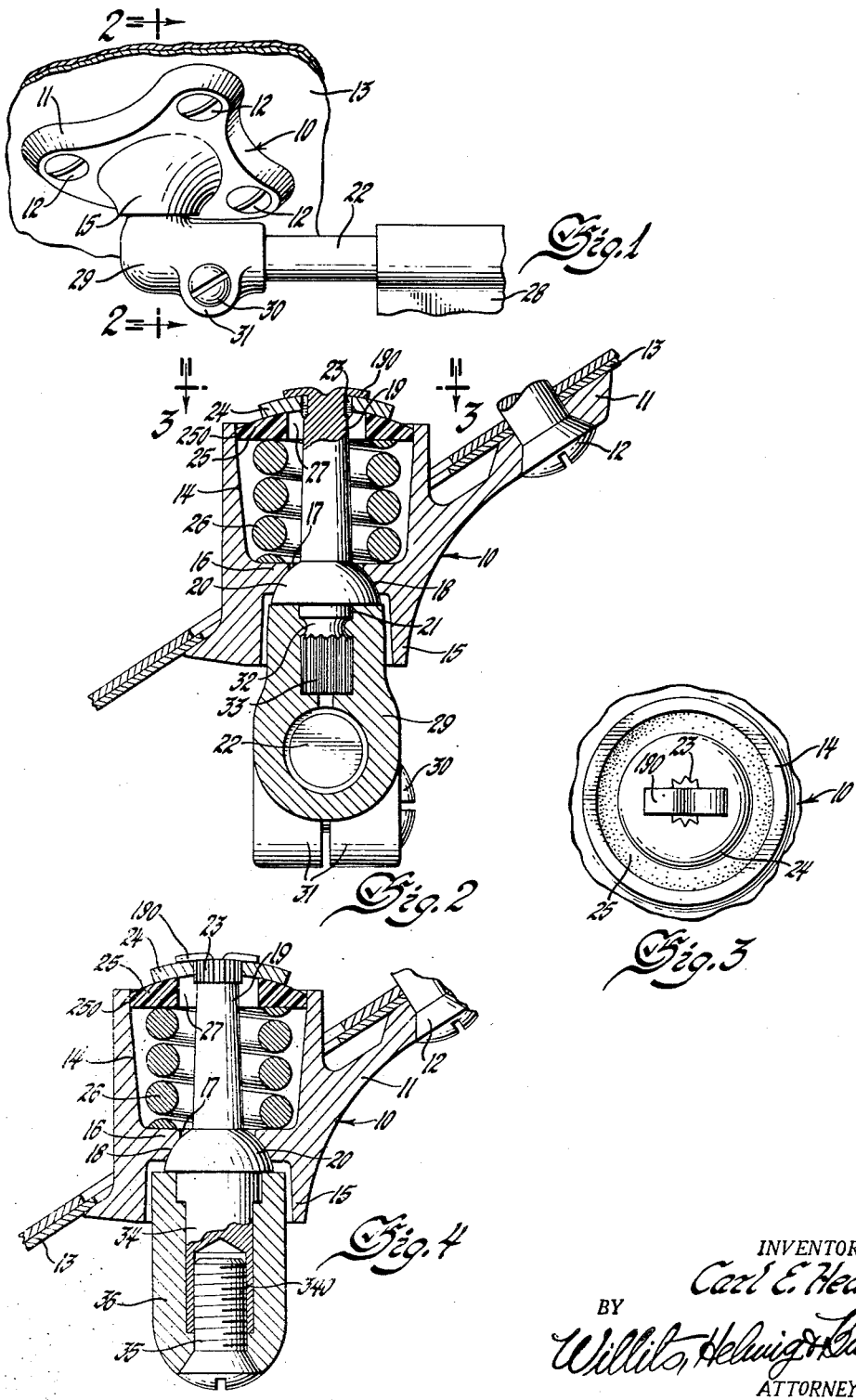
INVENTOR
Carl E. Hedeen
BY
Willits, Helwig & Bailles
ATTORNEYS

United States Patent Office 2,698,728
Patented Jan. 4, 1955

2,698,728

SUNSHADE SUPPORT

Carl E. Hedeen, Detroit, Mich., assignor to General Motors Corporation, Detroit, Mich., a corporation of Delaware Application November 21, 1951, Serial No. 257,496

4 Claims. (Cl. 248—278)

This invention relates to supports for sunshades and other items wherein adjustment of the item supported thereby in a plurality of positions is required or desired.

In normal automotive inside sunshade supports, a bracket is secured to the inside sheet metal upper frame panel of the car roof near the front corner pillar carrying a spindle from which the sunshade supporting arm extends at such an angle with respect to the windshield header and the adjacent door header that a simple swinging of the sunshade arm about the spindle presents the sunshade in one of two positions; namely (a) across the top of the windshield header or (b) across the top of the adjacent door header. The sunshade per se or the sunshade arm carrying the sunshade is generally swingably mounted about an axis substantially normal to the swingable axis of the spindle whereby to provide the driver with means for selecting the desired amount of protection from the sun's glare.

The inner sheet metal upper frame panel at the front of the car roof ofttimes is not held accurately in the manufacture of the car body, particularly inasmuch as gaging is generally done at the main roof panel to maintain door and windshield openings in their proper location. This situation creates the problem of misalignment of the inside sunshade from the desired positions to which it is constructed to be swung, either across the top of the windshield or across the top of the adjacent door header.

It has been found that, if a limited universal movement of the swingable axis of the inside sunshade support were available, the relatively narrow sunshade could be swung to the desired positions of use without resetting or shimming the bracket in respect to the point of support on the car body if the bracket were inadvertently installed so that the spindle carrying the sunshade supporting arm was out of its proper alignment. Also, such a limited universal movement of the swingable axis of the sunshade support would permit an additional tilting adjustment of the sunshade about its supporting bracket in respect to parallelism with the top of the windshield or the adjacent car door header thereby providing additional protection from the sun.

With the foregoing in view, it is the primary object of the invention to provide a support for an inside sunshade or the like including an improved, economical and simply constructed spindle swingably supporting the sunshade arm, the said spindle element being capable of limited universal movement about its axis whereby to provide limited tilting adjustment of the sunshade arm in addition to the normal swingable movement thereof.

A further object of the invention is to provide, in an inside sunshade bracket for mounting a sunshade arm in swingable relationship thereto, an effective and economical means for accomplishing limited universal movement of the sunshade arm on its swingable axis coupled with effective frictional retention of the sunshade in any of its adjusted positions.

Other objects of the invention will become apparent by reference to the following detailed description taken in connection with the accompanying drawing, in which:

Fig. 1 is a fragmentary elevational view showing an interior sunshade bracket embodying the invention mounted on the interior left front roof of an automobile.

Fig. 2 is a vertical sectional view taken on the line 2—2 of Fig. 1.

Figure 3 is a fragmentary top plan view taken on the line 3—3 of Figure 2.

Figure 4 is a vertical sectional view similar to Figure 2 showing alternate means for connecting the sunshade arm to the bracket spindle.

Referring now to the drawing wherein like numerals refer to like and corresponding parts throughout the several views, the particular embodiment of the invention disclosed in Figures 1–3 inclusive for illustrative purposes comprises, in general, a bracket 10 having a mounting flange 11 secured by suitable sheet metal screws or studs 12 to the inner roof construction 13 of an automobile body, the said bracket 10 including an upwardly disposed outwardly tapering socket 14 and a downwardly disposed socket 15 and a horizontal partition 16 therebetween centrally apertured at 17 and formed into a downwardly disposed ball seat 18 adjacent the said central aperture 17, a central spindle 19 including a semi-spherical ball member 20 seatable on the said ball seat 18, a depending stem 21 below the said ball member 18 which accommodates the visor arm bearing 29 into which the visor arm 22 is mounted, and a serrated head 23 onto which is telescoped in non-rotatable relationship a concaved retainer washer 24 against which is held in frictional engagement a complementary domed cover member 25 disposed in the upper end of the socket 14 with a compression spring 26 interposed between the horizontal partition 16 and the cover member 25, the said cover member 25 having an aperture 27 axially therethrough of sufficient size to permit the spindle 19 to have limited universal movement about the ball and socket mounting thereof at the horizontal partition 16.

After assembly of the spindle 19, spring 26, cover member 25 and washer 24 in the bracket 10, the top of the spindle 19 is peened or otherwise deformed as indicated at 190 to maintain the said elements in assembled relationship. Adequate clearance is provided between the stem 21 below the ball member 20 and the downwardly disposed socket 15 to permit the desired limited amount of universal movement of the spindle 19.

The complementary domed cover member 25 is preferably formed of nylon or other material that will provide adequate frictional resistance between the concaved retainer washer 24 and the cover member 25 under the loading of the compression spring 26 to maintain the central spindle 19 in any position to which it is turned or tilted responsive to any manual adjustment of the visor arm 22 on which the visor 28 is mounted.

It will be noted that the outer periphery 250 of the domed cover member 25 fits neatly in the upper portion of the tapered socket 14 whereby to prevent wobbling of the spindle 19.

The visor 28 may be fixedly mounted on the visor arm 22 and the visor 28 together with the visor arm 22 may be swung about the axis of the visor arm 22 when mounted in the usual split sleeve bearing 29 therefor formed as a part of the depending stem 21 of the spindle 19. A suitable screw 30 through the ears 31 of the split sleeve bearing 29 maintains the visor arm 22 in the proper frictional relationship therewithin to permit manual swingable adjustment of the visor 28 normal to the spindle 19 of the bracket 10 and yet hold the said visor 28 in its adjusted position. Obviously other means for supporting the visor in swingable relationship on an axis normal to the axis of the spindle 19 may be employed such as fixedly securing the visor supporting arm to the spindle and swingably mounting the visor on the visor arm.

In Figs. 1 and 2 the stem 21 of the spindle 19 below the ball member 20 may be suitably deformed at 32 and serrated at 33 to permit the visor rod split sleeve bearing element 29 to be die cast with the stem 21 of the spindle 19 as an insert, the deformation 32 and serrations 33 preventing axial and rotary movement of the die cast bearing element 29 in respect to the said spindle 19.

In Fig. 4 the spindle 19 is shown with a shouldered depending end 34 below the ball 20 axially bored and threaded at 340 to accommodate a screw 35 securing a visor rod supporting element 36 thereonto.

The improved visor bracket construction meets all of the requirements of interior sunshade supports and provides the usual swingable adjustments of the visor arm plus a limited universal adjustment thereof after swinging the same to a position above the windshield or the adjacent door header whereby to accommodate the interior sunshade neatly to the positions to which it is swung and to permit limited tilting of the sunshade about its supporting bracket to horizontal, above horizontal or below horizontal in respect to the windshield or adjacent door header giving more or less sunglare protection in many angular positions of the sun in respect to the automobile, and, where necessary, compensating for any installation inaccuracies that may occur.

Although a single embodiment of the invention has been disclosed together with one alternative construction, it is obvious that many changes may be made in the size, shape, arrangement and details of the various elements of the invention without departing from the spirit and scope thereof as defined by the appended claims.

I claim:

1. A sunshade support comprising a tapered socket having a downwardly facing smooth surfaced ball seat therein, a spindle extending through said socket and including a ball member seated on said seat for mounting said spindle for rotational and limited universal tilting movement within said socket, a compression spring in said socket, a separate domed annular cover for said socket, a complementary domed washer over said cover and fitting over the upper end of said spindle, and fastening means on said spindle outside said socket for holding said spring, cover and washer in assembled relationship, said compression spring being of such strength as to establish sufficient friction between said ball member and said seat and between said cover and said washer to maintain said spindle in any position to which it may be rotated or tilted.

2. A sunshade support comprising a mounting flange including upwardly and downwardly disposed sockets with a centrally apertured partition therebetween, a downwardly facing smooth surfaced ball seat formed in said partition around said aperture therein, a central spindle including a smooth surfaced ball member extending through said apertured partition with said ball member seating on said seat, a separate domed cover washer at the top of said upwardly disposed socket having an aperture therethrough larger than the said spindle through which the upper end of said spindle extends, a complementary domed washer non-rotatably fixed on said spindle, a compression spring interposed between said partition and said cover of sufficient strength to maintain said spindle frictionally in any position to which it may be adjusted, means for securing said parts in assembled relationship, and means for swingably supporting a sunshade from said spindle on an axis normal thereto.

3. A sunshade support for carrying a sunshade arm swingable on a substantially vertical axis and tiltable in a limited degree from any position to which it is swung comprising a mounting flange including an upwardly extending tapered socket having a central aperture in the base thereof formed into a downwardly facing smooth surfaced ball seat, a spindle extending through said aperture and said socket and having a smooth surfaced ball formed thereon seated in said ball seat, a compression spring around said spindle seated in the base of said socket, a separate centrally apertured domed cover washer over said compression spring disposed in spaced relationship around said spindle, a complementary domed washer on said spindle outside said socket, means on said spindle outside said socket for securing said last mentioned washer to said spindle in frictional engagement with said cover washer and compressing said spring, and means carried by said spindle below the ball thereof for supporting a sunshade arm substantially normal thereto, said spring creating sufficient frictional resistance to the rotational and universal movement of said spindle to maintain said sunshade arm in any of the positions to which it may be manually adjusted.

4. A sunshade support as claimed in claim 3 wherein the centrally apertured domed cover washer is positioned in said upwardly tapered socket and the complementary domed washer is non-rotatably mounted on said spindle.

References Cited in the file of this patent

UNITED STATES PATENTS

| Number | Name | Date |
|---|---|---|
| 1,565,876 | Wacker | Dec. 15, 1925 |
| 1,798,530 | Haigh | Mar. 31, 1931 |
| 2,112,464 | Jacobs | Mar. 29, 1938 |
| 2,121,525 | Johnson | June 21, 1938 |
| 2,284,502 | Westrope | May 26, 1942 |
| 2,298,176 | Schwartz | Oct. 6, 1942 |